US012626378B2

(12) United States Patent
Song et al.

(10) Patent No.: US 12,626,378 B2
(45) Date of Patent: May 12, 2026

(54) DIGITAL IMAGE CALCULATION METHOD AND SYSTEM FOR RGB-D CAMERA MULTI-VIEW MATCHING BASED ON VARIABLE TEMPLATE

(71) Applicant: SOUTHEAST UNIVERSITY, Jiangsu (CN)

(72) Inventors: Aiguo Song, Jiangsu (CN); Huiran Hu, Jiangsu (CN); Yuzhen Xie, Jiangsu (CN); Linhu Wei, Jiangsu (CN); Huijun Li, Jiangsu (CN); Lifeng Zhu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 278 days.

(21) Appl. No.: 18/648,456

(22) Filed: Apr. 28, 2024

(65) Prior Publication Data

US 2024/0428430 A1     Dec. 26, 2024

Related U.S. Application Data

(63) Continuation of application No. PCT/CN2023/105664, filed on Jul. 4, 2023.

(30) Foreign Application Priority Data

Jun. 25, 2023     (CN) .......................... 202310745655.0

(51) Int. Cl.
*G06T 7/33*          (2017.01)
*G06T 7/38*          (2017.01)
(Continued)

(52) U.S. Cl.
CPC ................ *G06T 7/337* (2017.01); *G06T 7/38* (2017.01); *G06V 10/36* (2022.01); *G06V 10/751* (2022.01);
(Continued)

(58) Field of Classification Search
CPC . G06T 2207/10028; G06T 7/33; G06T 19/20; G06T 2207/30061;
(Continued)

(56) References Cited

U.S. PATENT DOCUMENTS

2010/0239144 A1*  9/2010  Fichtinger .............. A61B 6/032
                                                       382/131
2015/0381968 A1*  12/2015  Arora ...................... G06T 17/00
                                                       348/47
(Continued)

FOREIGN PATENT DOCUMENTS

CN        109087388        12/2018
CN        109858504        6/2019
(Continued)

OTHER PUBLICATIONS

Yiteng Yuan, Jie Wang, Wei Li, Kaipeng Wang, Hong Rao, Jianfeng Xu, Fast supervoxel segmentation of connectivity median simulation based on Manhattan distance, International Journal of Applied Earth Observation and Geoinformation, vol. 133 (Year: 2024).*
(Continued)

*Primary Examiner* — Alex Kok S Liew
(74) *Attorney, Agent, or Firm* — JCIPRNET

(57) ABSTRACT

Disclosed is a digital image calculation method and system for RGB-D camera multi-view matching based on a variable template, the method includes six steps: acquiring data, preprocessing point cloud data, performing feature point matching, re-registering a variable template, calculating point cloud data transformation relationships among large-view images, and performing point cloud fusion. A size of a non-adjacent image matching template is adjusted based on registration results of adjacent angles of view, and correct registration of feature points of images from non-adjacent angles of view is accordingly achieved, which improves matching accuracy, eliminates cumulative errors in image
(Continued)

Acquire image sequences, and obtain and align color information and depth data

↓

Preprocess the point cloud data, eliminate ground and outliers, and obtain a region to be registered

↓

Perform feature point matching of adjacent images in the image sequences, and calculate transformation relationships of a point cloud coordinates under different angles of view

↓

Adjust scale and direction of a variable template corresponding to non-adjacent large-view images through calculation results to perform the registration again

↓

Calculate point cloud data transformation relationships among large-view images

↓

Perform fusion of final cloud data to achieve three-dimensional data reconstruction sets, and provides more accurate initial values for subsequent iterations of point cloud fusion, such that the number of iterations is reduced, and three-dimensional reconstruction of images is implemented.

9 Claims, 2 Drawing Sheets

(51) Int. Cl.
| | |
|---|---|
| *G06V 10/36* | (2022.01) |
| *G06V 10/75* | (2022.01) |
| *G06V 10/762* | (2022.01) |
| *G06V 10/80* | (2022.01) |

(52) U.S. Cl.
CPC .......... *G06V 10/762* (2022.01); *G06V 10/806* (2022.01); *G06T 2207/10016* (2013.01); *G06T 2207/10024* (2013.01); *G06T 2207/10028* (2013.01)

(58) Field of Classification Search
CPC . G06T 2207/10068; G06T 2207/10081; G06T 7/344; G06T 7/30; G06T 19/00; G06T 2207/10088; G06T 2207/10072; G06T 2210/41; G06T 17/00; G06T 2200/24; G06T 7/37; G06T 19/006; G06T 2219/028; G06T 17/20; G06T 2207/10016; G06T 2207/10064; G06T 2207/10076; G06T 2207/10104; G06T 2207/10108; G06T 2207/10116; G06T 2207/20081; G06T 3/14; G06T 7/12; G06T 7/337; G06T 12/10; G06T 2207/30012; G06T 7/0012; G06T 7/10; G06T 2207/30172; G06T 3/4038; G06T 7/0014; G06T 7/20; G06T 7/70; G06T 11/60; G06T 2207/30028; G06T 2207/30244; G06T 5/20; G06T 5/70; G06T 7/35; G06T 7/50; G06T 7/579; G06T 17/205; G06T 2200/04; G06T 2200/08; G06T 2207/10032; G06T 2207/10056; G06V 20/64; G06V 2201/03; G06V 20/653; G06V 2201/032; G06V 20/693; G06V 10/255; G06V 10/761; G06V 10/82; G06V 20/58; G06V 10/147; G06V 20/56; G06V 10/16; G06V 10/25; G06V 10/44; G06V 10/56; G06V 10/74

See application file for complete search history.

(56) References Cited

U.S. PATENT DOCUMENTS

| | | | |
|---|---|---|---|
| 2016/0157751 A1* | 6/2016 | Mahfouz ................ | A61B 5/062 |
| | | | 600/409 |
| 2018/0174325 A1* | 6/2018 | Fu ........................... | G06F 18/22 |
| 2020/0098294 A1 | 3/2020 | Alsheghri | |

FOREIGN PATENT DOCUMENTS

| | | |
|---|---|---|
| CN | 110264567 | 9/2019 |
| CN | 113112588 | 7/2021 |

OTHER PUBLICATIONS

Stanford CS231A Course Notes 1: Camera Models, (Year: 2017).*
Tian, Hui et al., "A method of automatically registering point cloud data based on range images", Science of Surveying and Mapping, vol. 37, No. 3, May 31, 2012, with English abstract thereof, pp. 41-43.
"International Search Report (Form PCT/ISA/210) of PCT/CN2023/105664," mailed on Mar. 5, 2024, pp. 1-3.
"Written Opinion of the International Searching Authority (Form PCT/ISA/237) of PCT/CN2023/105664," mailed on Mar. 5, 2024, pp. 1-4.

\* cited by examiner

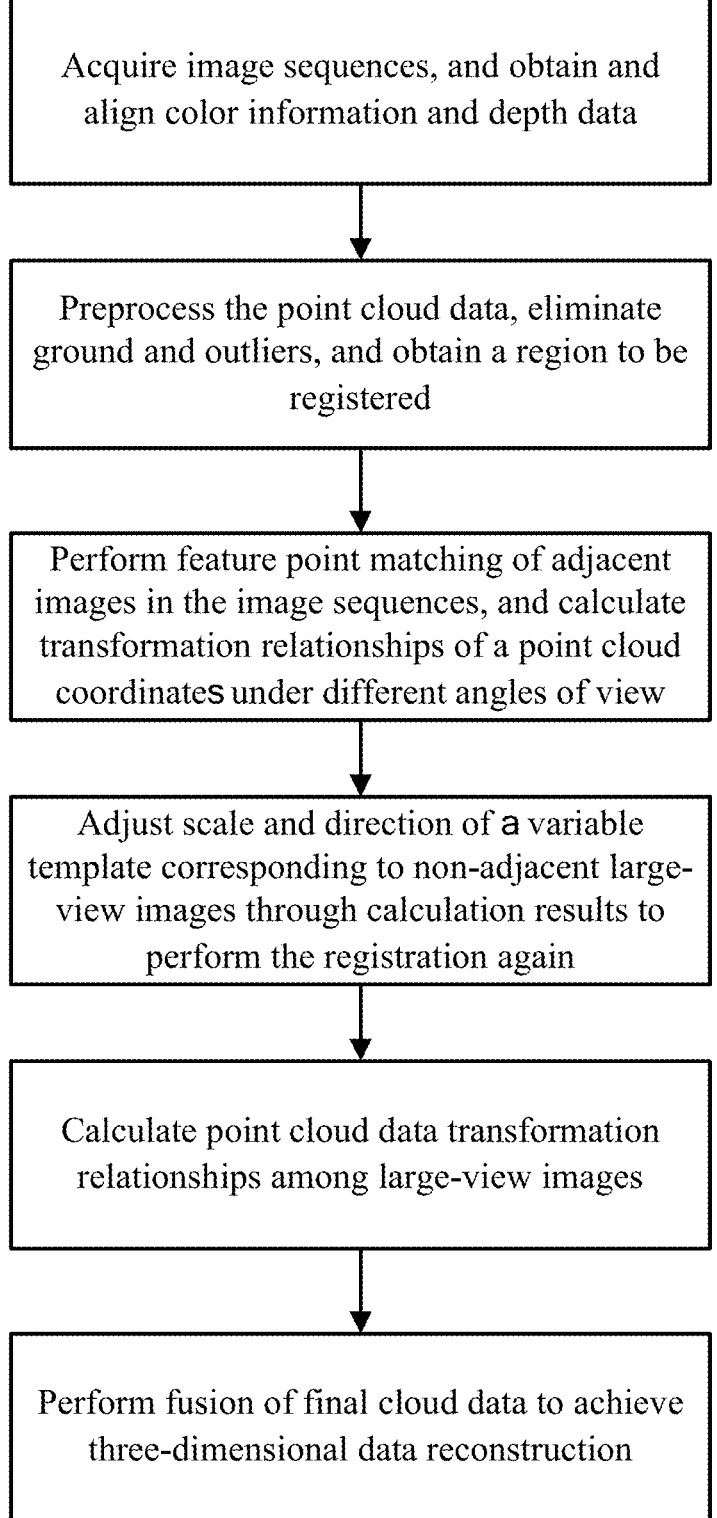

Acquire image sequences, and obtain and align color information and depth data

Preprocess the point cloud data, eliminate ground and outliers, and obtain a region to be registered Perform feature point matching of adjacent images in the image sequences, and calculate transformation relationships of a point cloud coordinates under different angles of view Adjust scale and direction of a variable template corresponding to non-adjacent large-view images through calculation results to perform the registration again Calculate point cloud data transformation relationships among large-view images Perform fusion of final cloud data to achieve three-dimensional data reconstruction

DIGITAL IMAGE CALCULATION METHOD AND SYSTEM FOR RGB-D CAMERA MULTI-VIEW MATCHING BASED ON VARIABLE TEMPLATE

CROSS-REFERENCE TO RELATED APPLICATION

This application is a continuation of international application of PCT application serial no. PCT/CN2023/105664 filed on Jul. 4, 2023, which claims the priority benefit of China application no. 202310745655.0 filed on Jun. 25, 2023. The entirety of each of the above-mentioned patent applications is hereby incorporated by reference herein and made a part of this specification.

TECHNICAL FIELD

The present disclosure belongs to the technical field of multi-view three-dimensional imaging and machine vision, and mainly relates to a digital image calculation method and system for RGB-D camera multi-view matching based on a variable template.

BACKGROUND

With the popularization of three-dimensional (3D) printing and virtual reality technology, there is an increasing demand for three-dimensional reconstruction techniques. Since the manual modeling using three-dimensional modeling software is extremely expensive, researchers have focused on three-dimensional reconstruction of an object by multi-view shooting of the object through a camera. Three-dimensional reconstruction methods based on an RGB-D camera can be roughly divided into two categories: point cloud-based method and image-based method. Although the point cloud-based reconstruction method has some good effects at present, such as the well-known ICP method and improvements thereof, it still has some limitations, particularly in processing scenes with disordered point clouds, in which case, an initial value close to a true value is required to avoid a local optimum solution, while the image-based reconstruction method relies on the matching of adjacent images. Generally, multi-view three-dimensional reconstruction involves the following steps: 1) sequences of multi-view images are captured through a camera, and feature points in the sequences are matched; and 2) a transformation relationship between images is calculated to align point cloud data of the image sequences. Therefore, the quality of three-dimensional reconstruction imposes higher requirements on the quality of feature point pairs and the accuracy of feature point matching.

Some problems may arise in the process of digital image correlation matching of the image sequences. For example, excessive rotation or scaling between non-adjacent images will lead to an increase in false matched points, making direct matching impossible. Moreover, as the number of images from different angles of view increases, the cumulative matching errors between adjacent images will cause bifurcation after point cloud alignment. Actually, relevant scholars have put forward some solutions to these problems. For example, epipolar geometrical constraints are used to reduce mismatches in the process of binocular stereo matching. However, this solution cannot be applied to single-camera multi-view scenes because it needs to know about relative poses of angles of view of two cameras in advance. For two images incapable of being directly matched, some previous studies have suggested inserting a series of intermediate images to incrementally accumulate results of guided matching, which is effective in most cases, but in the multi-view matching process, introducing too many intermediate images will increase computational costs, and it is difficult not to cause cumulative errors. Some feature point matching methods, such as scale-invariant feature transform (SIFT) and its improvements, have also achieved good results. However, these methods still have limitations, because they heavily rely on the number of feature points. Insufficient feature point pairs in two images to be matched could make the matching impossible. Related studies have also shown that matching at too large angles could result in significant errors, therefore, it is necessary to limit the angles of view of adjacent images. However, in a scene needing a large angle of view, introducing lots of smaller angles of view will undoubtedly accumulate matching errors.

SUMMARY

In order to address the problems of accumulation of matching errors and mismatches in a single RGB-D camera multi-view matching in the prior art, the present disclosure provides a digital image calculation method and system for RGB-D camera multi-view matching based on a variable template, the method includes six steps: acquiring data, preprocessing point cloud data, performing feature point matching, re-registering a variable template, calculating point cloud data transformation relationships among large-view images, and performing point cloud fusion. A size of a non-adjacent image matching template is adjusted based on registration results of adjacent angles of view, and correct registration of feature points of images of non-adjacent angles of view is accordingly achieved, which improves matching accuracy, eliminates cumulative errors in image sets, and provides more accurate initial values for subsequent iterations of point cloud fusion, such that the number of iterations is reduced, and three-dimensional reconstruction of images is implemented.

In order to achieve the above objectives, the technical solution adopted by the present disclosure is: a digital image calculation method for RGB-D camera multi-view matching based on a variable template, including the following steps:

S1, acquiring data: image information data are acquired through an RGB-D camera, the image information data comprise color information and depth data, and three-dimensional information and color information of point clouds of a measured object are aligned by an RGB-D camera calibration algorithm or a method for aligning internal parameters and the depth data of an integrated depth camera of the RGB-D camera with the color information;

S2, preprocessing point cloud data: pass-through filtering is performed on the three-dimensional information obtained in S1, and an optimal ground point cloud is determined and eliminated using a random sample consensus algorithm; and a cluster analysis is performed on the processed point clouds, the point cloud data with similar densities is retained using a density-based clustering algorithm, and a region to be registered is obtained;

S3, performing feature point matching: feature points of adjacent images in image sequences are tracked, and a relative pose transformation relationship of point cloud coordinates under each angle of view is calculated through positions of the feature points;

S4, re-registering a variable template: scale and direction of the variable template are adjusted according to calculation results of the relative pose transformation relationship of point cloud coordinates obtained in S3;

S5, calculating point cloud data transformation relationships among large-view images: the feature points of the images are registered according to the variable template obtained in S4 to obtain a coordinate transformation relationship between corresponding points; and S6, performing point cloud fusion: a pose transformation relationship between feature points matched in a set of point cloud data is calculated, and is used as an initial value of an iterative closest point algorithm to perform iterative calculation, the point cloud fusion is completed, and three-dimensional reconstruction of the images is implemented.

As an improved solution of the present disclosure, the specific calculation method of the three-dimensional information of the measured object in S1 is:

$$\begin{cases} X_{iw} = d_i \cdot (x_i - c_x)/f_x \\ Y_{iw} = d_i \cdot (y_i - y_x)/f_y \\ \quad Z_{iw} = d_i \end{cases}$$

where $d_i$ represents a depth value, that is, a distance of a target point from a plane of the camera; $c_x$, $c_y$, $f_x$, $f_y$ represent the internal parameters of the depth camera; and $X_{iw}$, $Y_{iw}$, $Z_{iw}$ represent positions of a target point in a world coordinate system;

the color information is acquired through a color information stream of the RGB-D camera, and the specific acquisition method is:

$$Color = (R, G, B)$$

where R, G, and B represent red, green, and blue channel values in the RGB-D camera, respectively.

As an improved solution of the present disclosure, "pass-through filtering is performed on the three-dimensional information to filter out background regions exceeding a set range" in S2 is specifically:

$$\begin{cases} X_{min} <= X_{iw} <= X_{max} \\ Y_{min} <= Y_{iw} <= Y_{max} \\ Z_{min} <= Z_{iw} <= Z_{max} \end{cases}$$

where $X_{min}$, $X_{max}$, $Y_{min}$, $Y_{max}$, $Z_{min}$, $Z_{max}$ represent detection thresholds in the world coordinate system, respectively; and in the random sample consensus algorithm, 3 points are randomly selected from the filtered point clouds, and after this process is repeated, a fitted plane containing a largest number of points is an optimal ground point cloud.

As an improved solution of the present disclosure, "correlation calculation is performed on the image sequences for tracking the image feature points" in S3, and a correlation formula is as follows:

$$C_{u,v} = \frac{\sum_{x,y}[r(x, y) - \bar{r}][d(x + u, y + v) - \bar{d}]}{\sqrt{\sum_{x,y}[r(x, y) - \bar{r}]^2 \sum_{x,y}[d(x + u, y + u) - \bar{d}]^2}}$$

where $\bar{r}$ and $\bar{d}$ represent pixel gray-scale means of a reference subset and a deformed subset, respectively; u and v represent horizontal and vertical offsets of the feature points in a deformed image; $r(x, y)$, $d(x+u, y+v)$ represents pixel gray-scale values of the reference subset and the deformed subset in an image coordinate system of $(x, y)$, $(x+u, y+v)$.

As an improved solution of the present disclosure, "a relative pose transformation relationship of point cloud coordinates under each angle of view is calculated through positions of the feature points" in S3, specifically, a rotation matrix R and a translation matrix T, and the coordinate transformation relationship between corresponding points is:

$$P_1 = \begin{bmatrix} R_2^1 & T_2^1 \\ 0 & 1 \end{bmatrix} P_2$$

where $P_1$, $P_2$ represent the positions of the feature points in the image before and after rotation and translation, respectively; and $$R_2^1, T_2^1$$

represents the rotation matrix and the translation matrix of the feature points in the images after rotation and translation relative to the rotation matrix and the translation matrix of the feature points in the image before rotation and translation; and according to the rotation matrix $$R_n^{n-1}$$

and the translation matrix $$T_n^{n-1}$$

of coordinate transformation relationships among all adjacent images in the image sequences, a relative pose transformation of the feature points of a $k^{th}$ image and an $n^{th}$ image can be calculated, which is converted into and expressed in an Euler angle as follows:

$$[\theta_x \quad \theta_y \quad \theta_z] = Euler(R_{k+1}^k \cdot R_{k+2}^{k+1} \dots R_n^{n-1})$$

where $\theta_x$, $\theta_y$ and $\theta_z$ represent scale parameters and direction parameters respectively, of the variable template.

As another improved solution of the present disclosure, "sampling of a reference template is described by using polar coordinates" in S4 is specifically:

$$\begin{bmatrix} x_r \\ y_r \\ 1 \end{bmatrix} = \begin{bmatrix} R \cdot \cos\theta \\ R \cdot \sin\theta \\ 1 \end{bmatrix}$$

where R represents a sampling radius, and $\theta$ represents a sampling angle; when a shooting angle changes, the deformed image is rotated around $\theta_x$, $\theta_y$ and $\theta_z$ axes in a space relative to the reference image, and the sampling of a deformation template is as follows:

$$\begin{bmatrix} x_d \\ y_d \\ 1 \end{bmatrix} = \begin{bmatrix} \cos\theta_z & -\sin\theta_z & 0 \\ \sin\theta_z & \cos\theta_z & 0 \\ 0 & 0 & 1 \end{bmatrix}\begin{bmatrix} R' \cdot \cos\theta \cdot \cos\theta_y \\ R' \cdot \sin\theta \cdot \cos\theta_x \\ 1 \end{bmatrix}$$

in the formula, the sampling radius and the sampling angle of the deformation template is set to be consistent with those of the reference template.

As another improved solution of the present disclosure, the coordinate transformation relationship between corresponding points in S5 is specifically:

$$P_k = \begin{bmatrix} R_n^k & T_n^k \\ 0 & 1 \end{bmatrix} P_n$$

where $P_k$, $P_n$ represent positions of the feature points in the $k^{th}$ image and the $n^{th}$ image, and $P_k$, $P_n$ represents a rotation matrix and a translation matrix of feature points in the $n^{th}$ image relative to feature points in the $k^{th}$ image;

As a further improved solution of the present disclosure, a calculation formula of the iteration termination in S6 is specifically:

$$\Delta\text{Loss} = \frac{1}{n}\sum_1^n |A_{current} - B_{current}| - \frac{1}{m}\sum_1^m |A_{last} - B_{last}| < \text{error}$$

where $A_{current}$, $B_{current}$ represent coordinates of a target point cloud and a changed point cloud of a current iteration, respectively; $A_{last}$, $B_{last}$ represent a target point cloud and a changed point cloud of a last iteration, respectively; m and n represent the numbers of corresponding points of point clouds in the current iteration and the last iteration, respectively; and error represents a threshold for iteration termination; and After iterative convergence, $$R_n^k$$

and $$T_n^k$$

are obtained, registration and fusion of point cloud data of the $k^{th}$ image and the $n^{th}$ image are implemented, and multi-view three-dimensional reconstruction is completed.

In order to achieve the above objectives, the technical solution adopted by the present disclosure is further: a digital image calculation system for RGB-D camera multi-view matching based on a variable template, including a computer program, and when the computer program is executed by a processor, the steps of any one of the above methods are implemented.

Compared with the prior art, the present disclosure has the following beneficial effects:

(1) In the present disclosure, a variable template is used to register images from different angles of view. Compared with the existing direct matching methods, the method provided in the present disclosure gives consideration to the changes in the area to be registered caused by the changes in the angles of view. The method in the present disclosure is intuitive, and simple and accurate, improving the matching accuracy and reducing the probability of mismatching.

(2) In the present disclosure, the normalized cross-correlation function is used as the image registration determination method, which reduces the influence caused by illumination under different angles of view; for the images under non-adjacent angles of view, the scale and direction of the variable template are obtained by means of the intermediate image calculation results, thereby avoiding the time loss caused by obtaining the variable template parameters through loop traversal, and making the method more accurate.

(3) In the present disclosure, the variable template can directly register an image with greater changes in the angles of view. Compared with a traditional guided matching method, the method in the present disclosure eliminates the cumulative errors caused by the guided matching.

(4) In the present disclosure, the relative pose transformation of the point clouds is calculated according to the matching results of the final feature points, and is substituted into the iterative closest point algorithm as initial iteration values, so that the iteration is not easy to fall into the local optimal solution, and the iteration is quickly converged, the number of iterations is reduced, and the iteration efficiency is improved.

BRIEF DESCRIPTION OF DRAWINGS

FIG. 1 is a flow chart of steps of a method in the present disclosure.

DETAILED DESCRIPTIONS OF THE EMBODIMENTS

Figure 2:
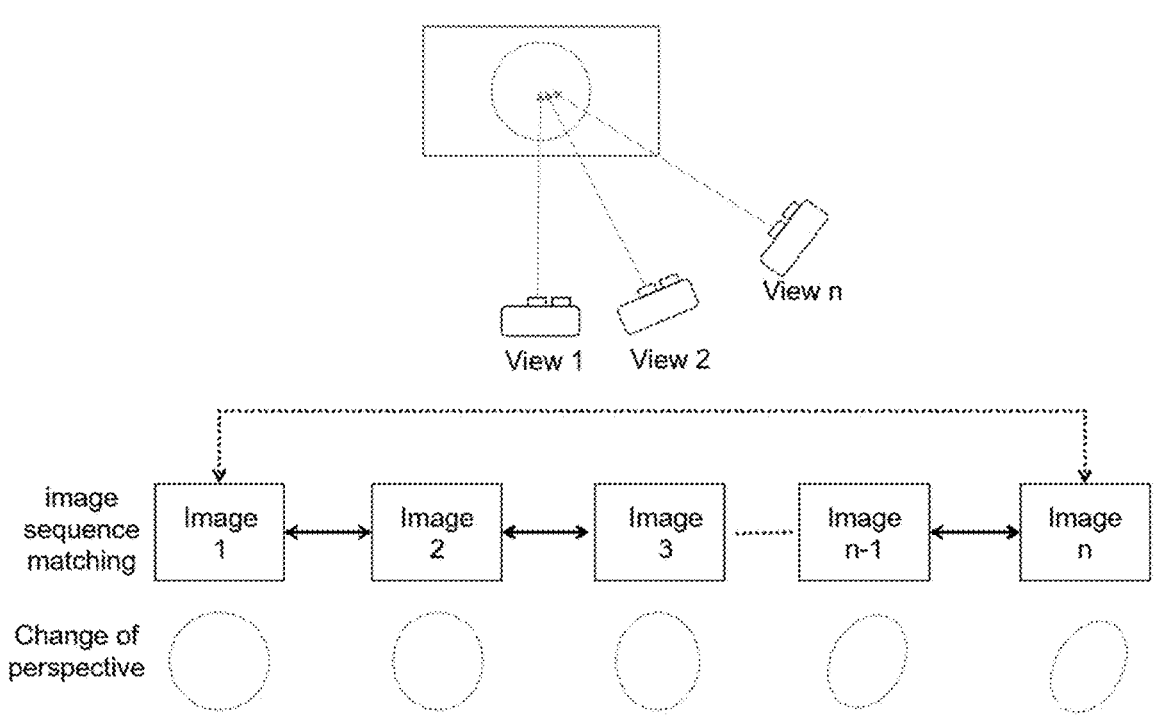
FIG. 2 is a schematic diagram of RGB-D camera multi-view matching in a method of the present disclosure.

The present disclosure will be further illustrated below with reference to the accompanying drawings and specific embodiments. It should be understood that the following specific embodiments are only used to illustrate the present disclosure, but are not intended to limit the scope of the present disclosure.

Embodiment 1

Since shooting angles of a single RGB-D camera are limited, only partial information of an object can be obtained by shooting from one angle of view. In some specific scenes, shooting needs to be performed from multiple angles of view, and multi-view matching needs to be performed. Matching of feature points of images from different angles of view is a key to three-dimensional reconstruction. However, as the angles of view of a camera change, a digital image correlation method will have phenomena of accumulation of matching errors and increase in mismatches, thereby affecting three-dimensional reconstruction effect. The present disclosure provides a digital image calculation method for RGB-D camera multi-view matching based on a variable template. First, data acquisition is performed, where an RGB-D camera is used as a data acquisition device, the RGB-D camera includes a color camera and a depth camera, and color information and depth data are acquired, where the depth data represents a distance of a target point from a plane of the camera. Three-dimensional information and corresponding color information of a measured object can be aligned by an RGB-D camera calibration algorithm or a method for aligning internal parameters and the depth data of an integrated depth camera of the RGB-D camera with the color information.

Then, point cloud data is preprocessed, where pass-through filtering is performed on depth images acquired therefrom, background regions exceeding a set range are filtered, and an optimal ground point cloud is identified using a random sample consensus algorithm and is eliminated. A cluster analysis is then performed, the point cloud data with similar densities is retained using a density-based clustering algorithm, outlier clouds are filtered out and point clouds belonging to the measured object are retained, and retained point cloud regions are regions for subsequent feature point selection and registration.

Then, feature point matching is performed, where the digital image correlation method is employed to track feature points of adjacent images in image sequences. Relative pose transformation under each angle of view is calculated through positions of the feature points, and scale and direction of the variable template are adjusted according to calculation results of the relative pose transformation. The variable template is used to calculate correlation between feature points of non-adjacent images, and pixel points obtained by sampling in an reference image and a deformed image can correspond to each other as many as possible through the adjusted variable template, such that influence caused by mismatch is reduced, and it is ensured that correct matching can be identified even if the angle of view changes greatly. A point with the greatest correlation is selected as a matched feature point.

Finally, a pose transformation relationship between feature points matched in a set of point cloud data is calculated, and is used as an initial value of an iterative closest point algorithm to perform iterative calculation, and when an iterative convergence condition is satisfied, point cloud fusion is completed.

A digital image calculation method for RGB-D camera multi-view matching based on a variable template, as shown in FIG. 1, the method specifically includes:

S1: acquire image sequences, and obtain and align color information and depth data.

Three-dimensional information and corresponding color information of a measured object are aligned by a method for aligning internal parameters and the depth data of an integrated depth camera of the RGB-D camera with the color information, and the calculation formula of the three-dimensional information is as follows:

$$\begin{cases} X_{iw} = d_i \cdot (x_i - c_x)/f_x \\ Y_{iw} = d_i \cdot (y_i - y_x)/f_y \\ Z_{iw} = d_i \end{cases}$$

where $d_i$ represents a depth value, that is, a distance of a target point from a plane of the camera; $c_x$, $c_y$, $f_x$, $f_y$ represent the internal parameters of the depth camera; and $X_{iw}$, $Y_{iw}$, $Z_{iw}$ represent positions of a target point in a world coordinate system;

the color information is acquired through a color information stream of the RGB-D camera, and the specific acquisition method is:

$$Color = (R, G, B)$$

where R, G, and B represent red, green, and blue channel values in the RGB-D camera, respectively:

S2: preprocess the point cloud data, eliminate ground and outliers, and obtain a region to be registered.

Pass-through filtering is performed on the images based on the three-dimensional information of the point clouds, thresholds are $X_{min}$, $X_{max}$, $Y_{min}$, $Y_{min}$, $Z_{min}$, $Z_{max}$, background regions exceeding a set range are filtered, and the specific formula is as follows:

$$\begin{cases} X_{min} <= X_{iw} <= X_{max} \\ Y_{min} <= Y_{iw} <= Y_{max} \\ Z_{min} <= Z_{iw} <= Z_{max} \end{cases}$$

where $X_{min}$, $X_{max}$, $Y_{min}$, $Y_{max}$, $Z_{min}$, $Z_{max}$ represent detection thresholds in the world coordinate system, respectively.

The random sample consensus algorithm is adopted to randomly select 3 points from the filtered point clouds, and this process is repeated for k times; a fitted plane containing a largest number of points is an optimal ground point cloud, and a difference set between the optimal ground point cloud and the filtered point cloud to eliminate ground point cloud data. The cluster analysis is performed on the processed point clouds, and the point cloud data with similar densities is retained using the density-based clustering algorithm to achieve the purpose of eliminating the outliers.

S3: perform feature point matching of adjacent images in the image sequences, and calculate transformation relationships of point cloud coordinates under different angles of view.

Correlation calculation is performed on the image sequences for tracking the image feature points, and a normalized cross-correlation formula is used as a correlation formula, such that registration under multiple angles of view is not affected by illumination:

$$C_{u,v} = \frac{\sum_{x,y}[r(x, y) - \bar{r}][d(x + u, y + v) - \bar{d}]}{\sqrt{\sum_{x,y}[r(x, y) - \bar{r}]^2 \sum_{x,y}[d(x + u, y + u) - \bar{d}]^2}}$$

where $\bar{r}$ and $\bar{d}$ represent pixel gray-scale means of a reference subset and a deformed subset, a point with the greatest correlation is selected as a matched feature point, and relative pose transformation under each angle of view is calculated through positions of the feature points, that is, a rotation matrix R and a translation matrix T.

Taking FIG. 2 as an example, in FIG. 2, a coordinate transformation relationship between an image 1 and an image 2 is calculated through the following formula:

$$P_1 = \begin{bmatrix} R_2^1 & T_2^1 \\ 0 & 1 \end{bmatrix} P_2$$

Similarly, $$R_n^{n-1}$$

of coordinate transformation relationships and translation matrices $$T_n^{n-1}$$

among all adjacent images in the image sequences can be calculated, so that a relative pose transformation of the feature points of a $k^{th}$ image and an $n^{th}$ image can be calculated, which is converted into and expressed in an Euler angle as follows:

$$[\theta_x \quad \theta_y \quad \theta_z] = Euler(R_{k+1}^k \cdot R_{k+2}^{k+1} \quad \ldots \quad R_n^{n-1})$$

$\theta_x$ $\theta_y$ and $\theta_z$ represent scale parameters and direction parameters respectively, of the variable template.

S4: adjust scale and direction of the variable template corresponding to non-adjacent large-view images through the calculation results to perform the registration again.

Figure 3:
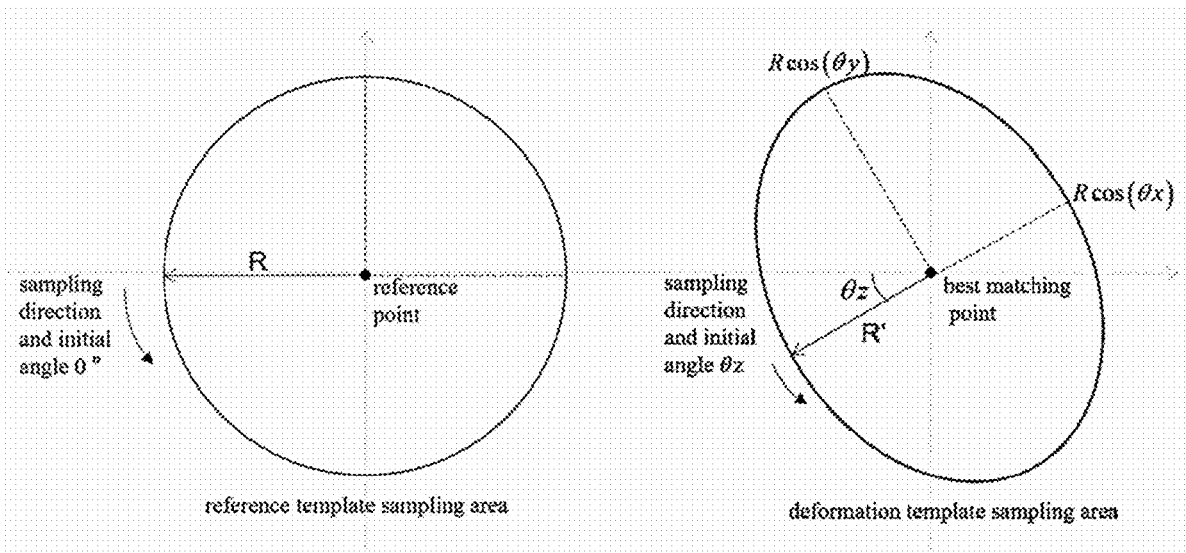
FIG. 3 is a schematic diagram of sampling of a variable template of a method in the present disclosure.

As shown in FIG. 3, sampling of the reference template is described by using polar coordinates:

$$\begin{bmatrix} x_r \\ y_r \\ 1 \end{bmatrix} = \begin{bmatrix} R \cdot \cos\theta \\ R \cdot \sin\theta \\ 1 \end{bmatrix}$$

where R represents a sampling radius, and $\theta$ represents a sampling angle; when a shooting angle changes, it is assumed that the deformed image is rotated $\theta_x$ $\theta_y$ $\theta_z$ around x, y and z axes in a space relative to the reference image, then the sampling of a deformation template is expressed in the following formula:

$$\begin{bmatrix} x_d \\ y_d \\ 1 \end{bmatrix} = \begin{bmatrix} \cos\theta_z & -\sin\theta_z & 0 \\ \sin\theta_z & \cos\theta_z & 0 \\ 0 & 0 & 1 \end{bmatrix} \begin{bmatrix} R' \cdot \cos\theta \cdot \cos\theta_y \\ R' \cdot \sin\theta \cdot \cos\theta_x \\ 1 \end{bmatrix}$$

Through the above formula, the sampling radius and the sampling angle of the deformation template is set to be consistent with those of the reference template.

In the formula, values of $\theta_x$ $\theta_y$ $\theta_z$ are determined through intermediate calculation results $$(R_{k+1}^k \cdot R_{k+2}^{k+1} \quad \ldots \quad R_n^{n-1}),$$

avoiding the time loss caused by loop traversal. This method can enable pixel points obtained by two sampling templates correspond as many as possible through the adjusted variable template, such that influence caused by mismatch is reduced, and it is ensured that correct matching can be identified even if the angle of view changes greatly.

S5: calculate point cloud data transformation relationships among large-view images.

Feature points of the $k^{th}$ image and the $n^{th}$ image are registered through the variable template, and the coordinate transformation relationship of the corresponding point of the $k^{th}$ image and the $n^{th}$ image can be obtained as:

$$P_k = \begin{bmatrix} R_n^k & T_n^k \\ 0 & 1 \end{bmatrix} P_n$$

S6: perform point cloud fusion, a pose transformation relationship between feature points matched in a set of point cloud data is calculated, and is used as an initial value of an iterative closest point algorithm to perform iterative calculation, and the point cloud fusion is completed.

$$R_n^k$$

and $$T_n^k$$

are substituted into the iterative closest point algorithm as initial iteration values, and a termination condition of ICP iteration is set to be mum times or a termination condition is satisfied:

$$\Delta Loss = \frac{1}{n} \sum_1^n |A_{current} - B_{current}| - \frac{1}{m} \sum_1^m |A_{last} - B_{last}| < error$$

After iterative convergence, $$R_n^k$$

and $$T_n^k$$

are obtained, registration and fusion of point cloud data of the $k^{th}$ image and the $n^{th}$ image are implemented, and multi-view three-dimensional reconstruction is completed.

Therefore, in the present disclosure, a size of a non-adjacent image matching template is adjusted based on registration results of adjacent angles of view, the feature points of the image with great changes in the angle of view can be directly matched, and correct registration of feature points of images of non-adjacent angles of view is accordingly achieved, cumulative errors caused by mismatching and intermediate calculation are reduced, and the matching accuracy is improved. The method provides more accurate initial values for subsequent iterations of point cloud fusion, the number of iterations is reduced, and three-dimensional reconstruction is implemented.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What is claimed is:

1. A digital image calculation method for RGB-D camera multi-view matching based on a variable template, comprising the following steps:

S1, acquiring data: image information data are acquired through an RGB-D camera, the image information data comprise color information and depth data, and three-dimensional information and color information of point clouds of a measured object are aligned by an RGB-D camera calibration algorithm or a method for aligning internal parameters and the depth data of an integrated depth camera of the RGB-D camera with the color information;

S2, preprocessing point cloud data: pass-through filtering is performed on the three-dimensional information obtained in the S1 to filter out background regions exceeding a set range, and an optimal ground point cloud is determined and eliminated using a random sample consensus algorithm; and a cluster analysis is performed on processed point clouds, the point cloud data with similar densities is retained using a density-based clustering algorithm, and a region to be registered is obtained;

S3, performing feature point matching: feature points of adjacent images in image sequences are tracked through a correlation calculation, and a relative pose transformation relationship of point cloud coordinates under each of angles of view is calculated through positions of the feature points;

S4, re-registering the variable template: scale and direction of the variable template are adjusted according to calculation results of the relative pose transformation relationship of the point cloud coordinates obtained in the S3;

S5, calculating point cloud data transformation relationships among large-view images: the feature points of images are registered according to the variable template obtained in the S4 to obtain a coordinate transformation relationship between corresponding points; and S6, performing a point cloud fusion: a pose transformation relationship between feature points matched in a set of the point cloud data is calculated, and is used as an initial value of an iterative closest point algorithm to perform iterative calculation, the point cloud fusion is then completed according to conditions for iteration termination, and three-dimensional reconstruction of the images is implemented.

2. The digital image calculation method for RGB-D camera multi-view matching based on the variable template according to claim 1, wherein specific calculation method of the three-dimensional information of the measured object in the S1 is:

$$\begin{cases} X_{iw} = d_i \cdot (x_i - c_x)/f_x \\ Y_{iw} = d_i \cdot (y_i - y_x)/f_y \\ Z_{iw} = d_i \end{cases}$$

wherein $d_i$ represents a distance of a target point from a plane of the camera; $c_x$, $c_y$, $f_x$, $f_y$ represent the internal parameters of the depth camera; and $X_{iw}$, $Y_{iw}$, $Z_{iw}$ represent positions of a target point in a world coordinate system, respectively;

the color information is acquired through a color information stream of the RGB-D camera, and a specific acquisition method is:

$$Color=(R,G,B)$$

wherein R, G, and B represent red, green, and blue channel values in the RGB-D camera, respectively.

3. The digital image calculation method for RGB-D camera multi-view matching based on the variable template according to claim 2, wherein the pass-through filtering is performed on the three-dimensional information to filter out the background regions exceeding the set range in the S2 is specifically:

$$\begin{cases} X_{min} <= X_{iw} <= X_{max} \\ Y_{min} <= Y_{iw} <= Y_{max} \\ Z_{min} <= Z_{iw} <= Z_{max} \end{cases}$$

wherein $X_{min}$, $X_{max}$, $Y_{min}$, $Y_{max}$, $Z_{min}$, $Z_{max}$ represent detection thresholds in the world coordinate system, respectively; and in the random sample consensus algorithm, 3 points are randomly selected from filtered point clouds, and after this process is repeated, a fitted plane containing a largest number of points is the optimal ground point cloud.

4. The digital image calculation method for RGB-D camera multi-view matching based on the variable template according to claim 3, wherein the feature points of the adjacent images in an image sequence are tracked through the correlation calculation, and the relative pose transformation relationship of the point cloud coordinates under each of the angles of the view is calculated through the positions of the feature points in the S3, and a correlation calculation formula is as follows:

$$C_{u,v} = \frac{\sum_{x,y}[r(x,y)-\bar{r}][d(x+u,y+v)-\bar{d}]}{\sqrt{\sum_{x,y}[r(x,y)-\bar{r}]^2 \sum_{x,y}[d(x+u,y+u)-\bar{d}]^2}}$$

wherein $\bar{r}$ and $\bar{d}$ represent pixel gray-scale means of a reference subset and a deformed subset, respectively; u and v represent horizontal and vertical offsets of the feature points in a deformed image; r(x, y), d(x+u, y+v) represents pixel gray-scale values of the reference subset and the deformed subset in an image coordinate system of (x, y), (x+u, y+v).

5. The digital image calculation method for RGB-D camera multi-view matching based on the variable template according to claim 3, wherein the relative pose transformation relationship of the point cloud coordinates under each of the angles of the view is calculated through positions of the feature points in the S3, specifically, a rotation matrix R and a translation matrix T, and the coordinate transformation relationship between the corresponding points is:

$$P_1 = \begin{bmatrix} R_2^1 & T_2^1 \\ 0 & 1 \end{bmatrix} P_2$$

wherein $P_1$, $P_2$ represent the positions of the feature points in the adjacent images before and after rotation and translation; and $$R_2^1, T_2^1$$

represents the rotation matrix and the translation matrix of the feature points in the adjacent images after rotation and translation relative to the rotation matrix and the translation matrix of the feature points in a image before rotation and translation; and
according to the rotation matrix $$R_n^{n-1}$$

and the translation matrix $$T_n^{n-1}$$

of coordinate transformation relationships among all of the adjacent images in the image sequences, a relative pose transformation of feature points of a $k^{th}$ image and an $n^{th}$ image can be calculated, which is converted into and expressed in an Euler angle as follows:

$$[\, \theta_x \quad \theta_y \quad \theta_z \,] = Euler\!\left(R_{k+1}^k \cdot R_{k+2}^{k+1} \; \ldots \; R_n^{n-1}\right)$$

wherein $\theta_x$, $\theta_y$ and $\theta_z$ represent scale parameters and direction parameters respectively, of wherein, the variable template.

6. The digital image calculation method for RGB-D camera multi-view matching based on the variable template according to claim 5, wherein scale and direction of the variable template are adjusted according to the calculation results of the relative pose transformation relationship of the point cloud coordinates in the S4, and a sampling formula is specifically:

$$\begin{bmatrix} x_r \\ y_r \\ 1 \end{bmatrix} = \begin{bmatrix} R \cdot \cos\theta \\ R \cdot \sin\theta \\ 1 \end{bmatrix}$$

wherein R represents a sampling radius, and $\theta$ represents a sampling angle; and when a shooting angle changes, a deformed image is rotated $\theta_x\, \theta_y\, \theta_z$ around x, y and z axes in a space relative to a reference image, and the sampling of a deformation template is as follows:

$$\begin{bmatrix} x_d \\ y_d \\ 1 \end{bmatrix} = \begin{bmatrix} \cos\theta_z & -\sin\theta_z & 0 \\ \sin\theta_z & \cos\theta_z & 0 \\ 0 & 0 & 1 \end{bmatrix}\begin{bmatrix} R' \cdot \cos\theta \cdot \cos\theta_y \\ R' \cdot \sin\theta \cdot \cos\theta_x \\ 1 \end{bmatrix}$$

wherein the sampling radius and the sampling angle of the deformation template is set to be consistent with those of reference templates.

7. The digital image calculation method for RGB-D camera multi-view matching based on the variable template according to claim 6, wherein the coordinate transformation relationship between the corresponding points in the S5 is specifically:

$$P_k = \begin{bmatrix} R_n^k & T_n^k \\ 0 & 1 \end{bmatrix} P_n$$

wherein $P_k$, $P_n$ represent positions of the feature points in the $k^{th}$ image and the $n^{th}$ image, and $P_k$, $P_n$ represents a rotation matrix and a translation matrix of the feature points in the $n^{th}$ image relative to the feature points in the $k^{th}$ image.

8. The digital image calculation method for RGB-D camera multi-view matching based on the variable template according to claim 7, wherein a calculation formula of the iteration termination in the S6 is specifically:

$$\Delta Loss = \frac{1}{n}\sum_1^n |A_{current} - B_{current}| - \frac{1}{m}\sum_1^m |A_{last} - B_{last}| < error$$

wherein $A_{current}$, $B_{current}$ represent coordinates of a target point cloud and a changed point cloud of a current iteration, respectively; $A_{last}$, $B_{last}$ represent a target point cloud and a changed point cloud of a last iteration, respectively; m and n represent a numbers of corresponding points of point clouds in the current iteration and the last iteration, respectively; and error represents a threshold for the iteration termination; and after iterative convergence, $$R_n^k$$

and $$T_n^k$$

are obtained, registration and fusion of point cloud data of the $k^{th}$ image and the $n^{th}$ image are implemented, and multi-view three-dimensional reconstruction is completed.

9. A digital image calculation system for RGB-D camera multi-view matching based on a variable template, comprising a computer program, wherein when the computer program is executed by a processor, steps of any one of above methods are implemented.

* * * * *